United States Patent Office 3,408,210
Patented Oct. 29, 1968

3,408,210
DEHYDRATION OF FOODS
Wilbert A. Heyman, 82 Monroe St.,
Lawrence, N.Y. 11559
No Drawing. Filed June 14, 1965, Ser. No. 463,937
12 Claims. (Cl. 99—204)

This invention relates to a process for the dehydration of food products; more particularly it relates to a process for the dehydration of food products with the aid of a heat transfer agent at low pressures and consequently lower temperatures.

Many food dehydration processes are known where high vacuum and low temperatures are used but they require excessively long times to complete the dehydration process and there is no visible means of determining when the dehydration process has been completed without interrupting the process with the consequent possibility of spoilage and the possible development of harmful and perhaps poisonous bacterial growth due to an unsuspected high moisture content.

The process of dehydrating frozen food where the water in the form of ice is removed by sublimation by high vacuum (without causing the ice to melt) produced by mechanical pumps is also well known, but these processes are time consuming and require expensive equipment. Vacuums on the order of 500 microns require as long as eight to thirteen hours to complete the removal of the ice in each process because of the slow heat transfer and even then there is no means of knowing when the moisture is completely removed from every particle of the food. High moisture content may result in a botulism type of food spoilage.

One phase of this invention is based on the discovery that it is advantageous to dehydrate certain foods at relatively low temperatures in order to retain their important physiological and nutritive properties.

Another phase of the invention is based on the discovery that a certain type of heat transfer agent has unexpected advantages for the dehydration of food products under reduced pressure by greatly shortening the time required for dehydrating the food. The type of heat transfer agent referred to also has the advantage of enabling visual inspection of the progress and completion of the dehydration process.

The type of heat transfer agent to be described is also advantageous in retaining the delicate volatile aromatic and flavor constituents of the fresh food being dehydrated, and in retaining the vitamin contents of the dehydrated foods, the enzyme properties, the color, and the nutritive properties of the food being treated.

Among other objects of the invention is to provide a dehydrated food product which is readily rehydrated and which, when reconstituted, is free from objectionable flavors or appearances.

Among other objects of the invention is to provide a process of dehydrating foods which permits one to determine by observation and without interrupting the process, when dehydration is complete.

The objects of the invention are attained by dehydrating the food products at temperatures varying from about −6° C. to about 93° C. (depending on the type of food), while under a high vacuum of about 100 microns to 25,000 microns while immersed in a liquid consisting essentially of the substantially fully acetylated monoglycerides of oleic, linoleic, palmitic, or stearic acids, either alone or in mixtures.

Under the process of the invention, almost any food product can be substantially completely dehydrated so that it can be preserved for long periods of time and then be readily rehydrated to provide the essential taste and nutritive properties of the original food. Foods which have been dehydrated by the process of this invention include fruits of all kinds such as bananas, peaches, pears, apricots, dates, pitted prunes, berries such as strawberries, raspberries, cranberries, blackberries, blueberries, grapes, cherries; poultry such as chicken and turkey, fish such as fillets of fish, smoked fish such as herring and cod, small fish such as anchovies and sardines, clams and small octopuses, crabmeat and lobster and other kinds of fish; meats such as sliced tongue, sliced salami and sliced bolonga, steaks, chopped meat, sliced ham, sausages, pork, sliced smoked bacon; vegetables such as edible green corn, peas, beans, spinach, tomatoes, etc.

The acetylated monoglycerides of oleic, linoleic or palmitic acids are available commercially. Such products can be made by reacting edible animal fats such as lard, or vegetable oils such as cottonseed or soybean oil etc. (which are triglycerides of one or more of the fatty acids, oleic, linoleic, palmitic and stearic acids) with edible glycerol under such conditions as to provide the monoglycerides of said fatty acids and then acetylating the said monoglycerides. These products can be purified by vacuum distillation. The monoglycerides are substantially completely acetylated. The inventor is aware of U.S. Patent No. 2,354,495 which makes use of certain monoglycerides as a heat transfer agent in the dehydration of meats and vegetables but the acetylated derivatives of monoglycerides as defined above are distinct from the unacetylated monoglycerides and have certain advantages over the latter as will be apparent from the discussion which follows. Also the process of withdrawing moisture with the aid of a high vacuum is not disclosed by said patent.

Such acetylated monoglycerides can be purified by distillation before and after use and preferably the distilled products are employed in the present process.

The acetylated monoglycerides as defined, are water-white and highly fluid materials which do not solidify at various temperatures from about +8 to −5° C. Because of this fluidity they are excellent heat transfer agents. The ebullition which occurs during the removal of moisture vapors enables them to accept heat units from their containers and transfer this heat to every portion of the food material surrounded by them. Even at approximately their solidification or congealing temperature these compounds are liquid enough so that the bubbles of water vapor can be observed moving upwardly from moisture-containing food immersed therein when under high vacuum. These acetylated monoglycerides also penetrate into the cells and interstices of the foods so that they transmit heat to foods which are not finely divided and thus accelerate their dehydration, thus saving time and money and assuring the keeping qualities of the dehydrated foods throughout.

The acetylated monoglycerides, as defined, are soluble in 80% and higher, ethyl alcohol and can, when desired, be substantially removed from the dried food product by such alcohol. These acetylated monoglycerides are more readily removed from food products than corresponding unacetylated monoglycerides, and it is believed that this property is due to the fact that there are fewer hydrophyllic or hydrogen-bonding OH groups present in the acetylated products. Thus the great bulk of acetylated monoglycerides can be removed from dehydrated food products by centrifuging, especially since they have a relatively low viscosity at room temperature.

The acetylated monoglycerides are very stable compounds which do not become rancid over long periods of time. These compounds are not only resistant to the degradative influence of the oxygen of the air but they are relatively inert and poor solvents for the vitamins, enzymes and flavor components of the food being dehydrated.

On the other hand, these acetylated monoglycerides are not hydrophobic as are most oils so that the presence of a thin layer of said heat transfer agent on the dehydrated product does not delay rehydration of the food product when desired. Wetting agents such as lecithin, sucrose palmitate may be added to the acetylated monoglyceride to accelerate the absorption of water by the foods and assist in the rehydration.

These acetylated monoglycerides can be used repeatedly without deteriorating, especially when the dehydrated mix is first cooled and the vacuum is broken by the admitting of inert gases such as $CO_2$ and $N_2$.

Fat soluble and water soluble vitamins (in addition to those already present in the foods), inhibitors or antioxidants such as propyl gallate, sweeteners, both artificial and natural may be incorporated into the dehydrated foods by adding such materials to the said heat transfer agent. These products adhere and are at least partly retained by the foods after dehydration.

Acetylated monoglycerides as defined are entirely edible and nutritious food materials and commercial preparations thereof have been accepted by the United States Food and Drug Administration. When used with cooked foods where heat does not damage or change the nutritious qualities or the flavor properties of the foods, they can be used with higher heats to greatly accelerate the speed with which the foods can be dehydrated under the vacuum being used. Thus, lower vacuums and higher heats can be employed to obtain the same dehydration as higher vacuum and lower heat. It will be noted that although the containers for such heat transfer agents and foods may be heated to a relatively high temperature the food itself does not attain the same temperature as long as moisture is being evaporated therefrom.

EXAMPLE 1

Ripened bananas, the ripeness of which is indicated by a rich yellow skin on which there are a few black splotches, are selected, peeled and sliced to a thickness of ¼ to ½ inch. The slicing is preferably done in an atmosphere of inert gas and the slices are dropped immediately into a bath of acetylated monoglycerides consisting of a mixture of acetylated monoglycerides of oleic, linoleic and palmitic acids such as obtained from cottonseed oil. The container, usually a pan made of stainless steel or aluminum, is transferred to a conventional vacuum shelf drier provided with means for heating and cooling the shelves and with a transparent window. The interior of the vacuum shelf drier is exhausted to about 500–1,000 microns of mercury above absolute and heat is applied to the shelves, is transmitted to the pan and through the pan to the heat transfer agent and into the bananas. As long as there is substantial moisture in the bananas the temperature of the banana does not rise to the temperature of the heat transfer agent because heat is consumed in evaporating the moisture. As the moisture is evaporated the heat is regulated and gradually lowered in order to adjust the amount of heat introduced in relation to the moisture remaining in the bananas. After the bubbles caused by the escaping vapors become greatly reduced in number and size indicating that the end of the operation is approaching, the heat is then raised to assure the absence of moisture on the interior of the slices. This heat can go as high as 65° C. without causing a discoloration of the banana slices. When the bubbling ceases at this temperature it is an indication that the banana slices are dried to a point of less than 3% moisture which is sufficiently dry to guarantee complete stability and preservation of the nutritional values of the banana. Slices are recovered by cooling to about 5–10° C., breaking the vacuum by introducing nitrogen in the drier and draining the heat transfer agent therefrom. The slices have the original shape and appearance, but are somewhat shrunk from loss of water. On rehydration, the banana slices swell again to their original size and have the consisteency of ripe banana slices. Their flavor is substantially equal to the original flavor.

Dried products prepared in this manner are crisp and are preferably packaged in moisture proof air-tight containers to keep them in their crisp state. Such products have been thus preserved in hand-sealed jars for at least about a year and still have their original characteristic banana taste and their physical and nutritive properties without rancid or off-color tastes.

EXAMPLE 2

When it is desired to produce a dried slice which is larger than the original, the banana slices are substantially dehydrated as above but at the end of the dehydration the temperature is raised to about 76° C. and the vacuum increased so that the interior residual moisture expands the slice and increases its size and brittleness. The heat transfer liquid is then cooled to about 5 to 10° C. and the banana slices are thereby cooled and set so that the increased size remains after the slices are removed from the drier. The slices are then substantially equal to or greater in size than the original banana slices. They are crunchy, tender, delicious in flavor and without change of color or taste.

EXAMPLE 3

The process is conducted as in Example 1 except that the dehydrated banana slices, after removal of the bulk of the heat transfer agent, are centrifuged to remove a substantial proportion of the residual acetylated monoglyceride and then soaked in ethyl alcohol to remove substantially all of the remaining heat transfer liquid. The alcohol is then drained from the soaked banana slices and the residual alcohol is removed by subjecting them to vacuum and heat. The resultant slices are packed in moisture proof hermetically sealed containers. The resultant product on rehydration is excellent for baby food.

EXAMPLE 4

The process is conducted as in Example 1 except that whole ripe strawberries are substituted for the sliced bananas. The temperature of the acetylated monoglyceride in the vacuum drier is allowed to reach about 38° C. and at a vacuum of about 1,000 microns or less is applied. The dehydrated berries or fruits retain their volatile aroma and flavor as well as their enzymic properties, vitamins, minerals and eating qualities. They remain edible and can be rehydrated or eaten just as they are.

EXAMPLE 5

The process is conducted as in Example 4 except that the strawberries are frozen while surrounded by the heat transfer agent. The frozen berries are then subjected to a vacuum of between 500 and 1,000 microns while applying gentle heat. The berries remain frozen until the completion of the dehydration process. The temperature of the heat transfer agent is then raised sufficiently high to effect vaporization of the ice without melting it and continued to effect substantially complete dehydration without melting the ice. The vapors can be observed escaping through the liquid and as dehydration nears completion, the temperature of the fluid is lowered in order not to supply more heat to the frozen berry than is required for dehydration. The dried berries retain their delicious flavor and natural color. When the bubbling of vapors through the heat exchange liquid substantially ceases, the vacuum is broken by introducing an inert gas. The excess of heat transfer agent is removed by subjecting the dehydrated strawberries to centrifugal force in a perforated basket centrifuge at room temperature. The dehydrated berries are packaged in a moisture proof container in which the air is replaced by an inert gas such as $CO_2$ or $N_2$. The dried berries are light in weight, and can be rehydrated by soaking them in water or milk, and they retain their natural flavor.

Other berries such as blueberries, raspberries, cranberries, blackberries, mulberries and etc. are frozen and dehydrated in the same manner. Also fruits such as fresh or partially dehydrated apple slices, peach slices, pear slices, grapes and raisins and tropical fruits such as mangoes, guayabanoas, avocadoes, and the like are dried in the same manner as strawberries.

EXAMPLE 6

The process is conducted as in Example 1, 4 or 5, except that about 50 g./l. of finely powdered sodium or calcium cyclamate is dispersed in the heat transfer liquid prior to adding the fruit. A substantial portion of the sodium or calcium cyclamate is transferred to the moist fruit before complete dehydration during the treatment so that artificially sweetened dehydrated fruit is obtained.

EXAMPLE 7

The process is conducted as in Example 1, 4, 5 or 6 except that 10 g./l. of vitamin C is added to the heat transfer liquid which is maintained at −1° C. while the sliced apples are incorporated therein. This mixture is placed in suitable pans in a vacuum drier and the vacuum is raised to 500–1,000 microns of mercury. Heat is gradually applied to provide the necessary energy to evaporate the water or to sublime the ice but the temperature of the fruit slices is maintained at slightly less than 0° C. When the water vapor ceases to be evolved from this mix as indicated by the cessation of the bubbling of the liquid surrounding the apple slices, the vacuum is broken by injecting carbon dioxide into the chamber. Excess heat transfer liquid is drained off, the dehydrated slices are subjected to centrifugal force and then the apples are soaked in ethyl alcohol. After draining off the excess of ethyl alcohol with its dissolved acetylated monoglyceride, the dried apples are subjected to vacuum and gently warmed to remove the alcohol. Partially dehydrated slices of apples such as sold commercially may be substituted for fresh apples.

EXAMPLE 8

The process as conducted in Example 1 or 5 except that whole fresh grapes are substituted for sliced bananas or strawberries and when dehydration is almost complete, the acetylated monoglycerides are drained therefrom while still under the influence of the vacuum. The vacuum is then raised to 100 microns to vaporize internal residual moisture. The vacuum is then broken by injecting carbon dioxide. The resultant products are hollow, spherical balls.

EXAMPLE 9

Peeled and deveined, cooked or raw shrimp are dropped into a container containing the mixture of acetylated monoglycerides of oleic, linoleic and palmitic acids at a temperature of about −6° C. The container is placed in a vacuum drier provided with heating and cooling coils and a vacuum is applied of the order of 500–1,000 microns. The temperature within the pans in the vacuum drying oven is permitted to rise to about 100° F., but the temperature of the shrimp in the pans is maintained below 0° C. so that the water is removed by sublimation. The dehydration process is complete in about 4 hours.

EXAMPLE 10

The process is conducted as in Example 8 but meat products such as liver or brain are substituted for the grapes and about 0.5% of propyl gallate is added to the acetylated monoglycerides. After draining off the acetylated monoglycerides and continuing the application of vacuum, the temperature of the contents of the drier is reduced to between 6 and 20° before breaking the vacuum by introducing inert gas therein. These products are also preferably packaged under vacuum or in the presence of inert gases.

The process of Examples 8–10 may be applied to cooked and raw meats, crab and lobster meats, clams, fish filets, small fish—canned sardines, canned salmon and canned tunafish, etc. It is preferred that the temperature of the fish, meat and sea food products be kept below about 93° C. during dehydration, whereas in the treatment of fruits the temperature may be allowed to reach 65° C. where products of low volume are desired or about 70° C. where expanded or porous products are desired. With higher temperatures, vacuums as high as 25,000μ (1 inch) may be employed.

EXAMPLE 11

Vegetable and meat products may be dehydrated while in powdered form by the process of the invention. Thus, 1 pound of fresh mushrooms are dipped in boiling water to wash and blanch them, and drained. Approximately 1 pound of the acetylated monoglycerides are added and the mix is ground to a particle size capable of passing a 20 mesh screen. The slurry is then transferred to vacuum pans and dehydrated as in any of the previous examples. The mushroom powder so produced has excellent flavor and aroma and keeps indefinitely without deterioration.

EXAMPLE 12

Powdered dehydrated meat is prepared in the same way as the mushrooms of Example 11 except that .001% of butylated hydroxy anisol is added to the acetylated monoglycerides which is added to the meat before grinding.

EXAMPLE 13

Powdered dehydrated fish are prepared in the same way as the powdered meat of Example 12, except that .01% of butylated hydroxy anisol and .001% of citric or phosphoric acid are added to the acetylated monoglycerides before adding to the fish and grinding.

The features and principles underlying the invention described above in connection with specific exemplifications will suggest to those skilled in the art many other modifications thereof. It is accordingly desired that the appended claims shall not be limited to any specific feature or details thereof.

I claim:
1. A process for dehydrating solid foodstuffs comprising immersing said products in a liquid selected from the group consisting of the acetylated monoglycerides of oleic, linoleic, palmitic and stearic acids and mixtures thereof, and subjecting said mix to a vacuum of 10 to 25,000 microns of mercury and at temperatures of about −5 to about 93° C. for a time sufficient to remove substantially all of the water therefrom.

2. The process as claimed in claim 1 wherein the foodstuff is a fruit, and about 3% of water is allowed remain in the dehydrated product.

3. The process as claimed in claim 1 wherein said foodstuff is a seafood and the dehydration is carried out under such conditions that the temperature of the product during dehydration under the vacuum remains below 0° C.

4. The process as claimed in claim 1 wherein the foodstuff is a fruit and the temperature of the foodstuff under vacuum is allowed to rise sufficiently, as the final water is being removed therefrom, to expand the foodstuff.

5. The process as claimed in claim 1 comprising the step of adjusting the temperature of the product to between 6 and 20° C. while under the influence of the vacuum and breaking the vacuum by admitting inert gas.

6. The process as claimed in claim 1 comprising adding water soluble sweetening agents to the mix before dehydrating.

7. The process as claimed in claim 1 comprising adding edible inhibitors to oxidation to the acetylated monoglycerides.

8. The process as claimed in claim 1, comprising adding concentrated vitamins to the acetylated monoglycerides.

9. The process as claimed in claim 1 comprising draining the acetylated glycerides from the foodstuff while still under the influence of the vacuum and while said foodstuff still contains residual moisture, thereafter increasing the vacuum so as to evaporate additional moisture and expand the foodstuffs.

10. The process as claimed in claim 9 comprising cooling the foodstuffs to 6–20° C. to set the shape of the products and breaking the vacuum by admitting inert gas.

11. The process as claimed in claim 5 comprising centrifuging the dehydrated foodstuff to remove adhering acetylated monoglycerides therefrom.

12. The process as claimed in claim 11 comprising removing residual amounts of acetylated glyceride by soaking the dehydrated product in ethyl alcohol of at least 80% strength.

No references cited.

LIONEL M. SHAPIRO, *Primary Examiner.*